United States Patent Office 3,230,052
Patented Jan. 18, 1966

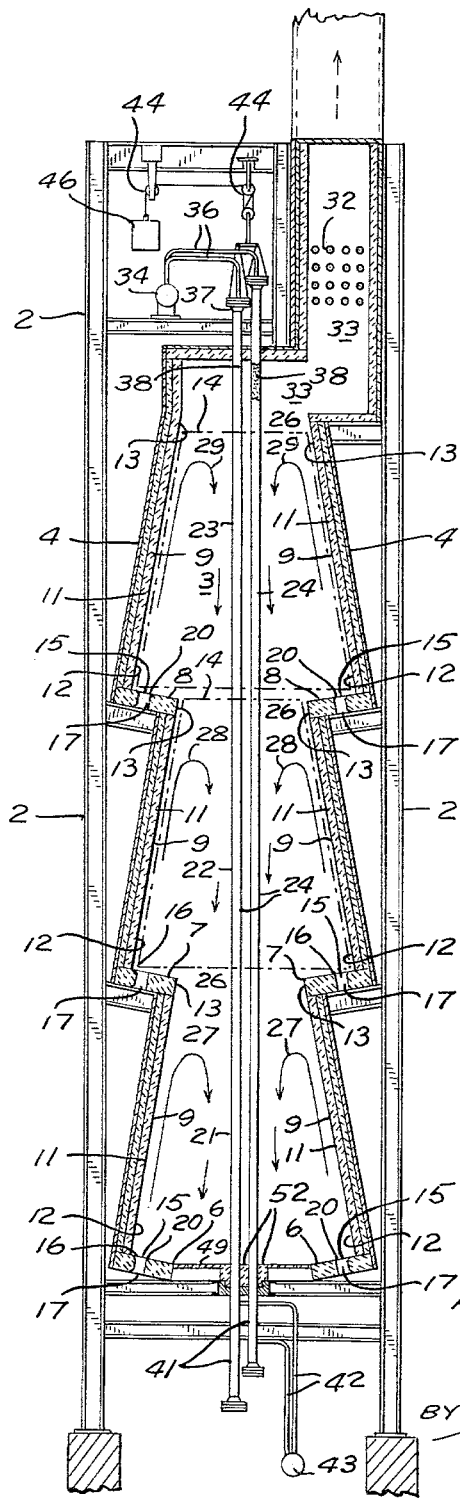

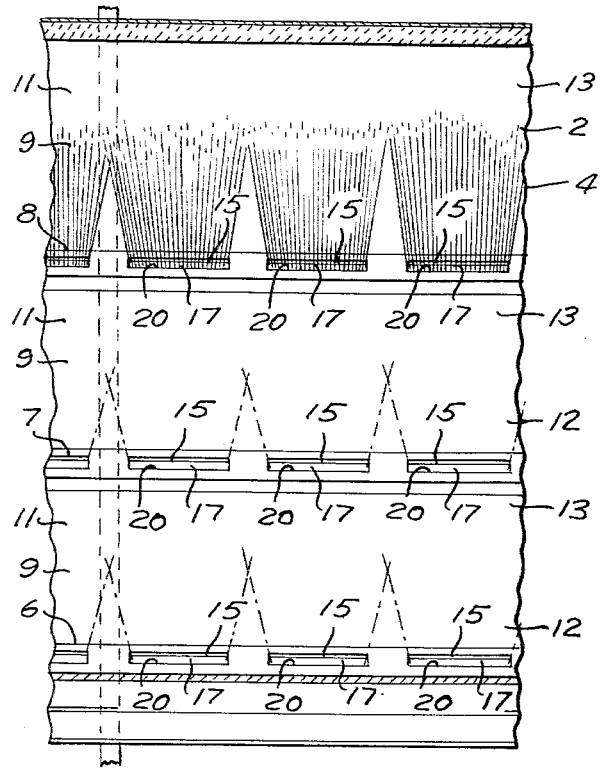
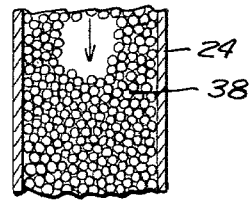
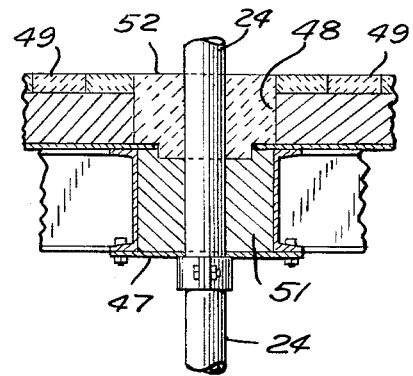
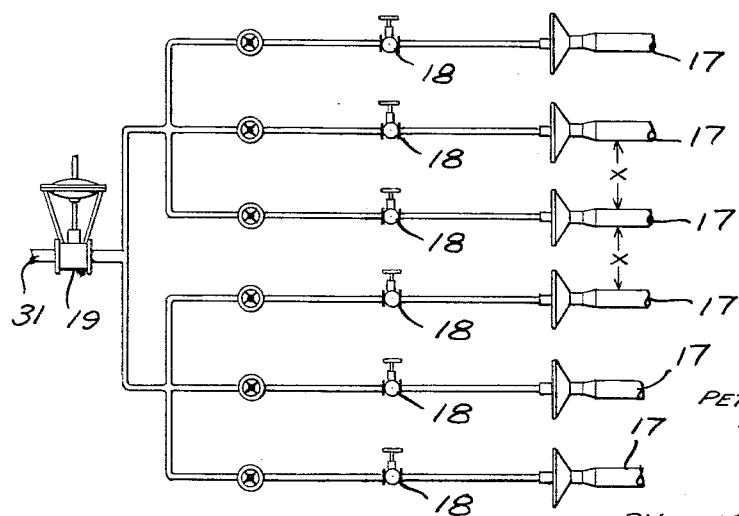

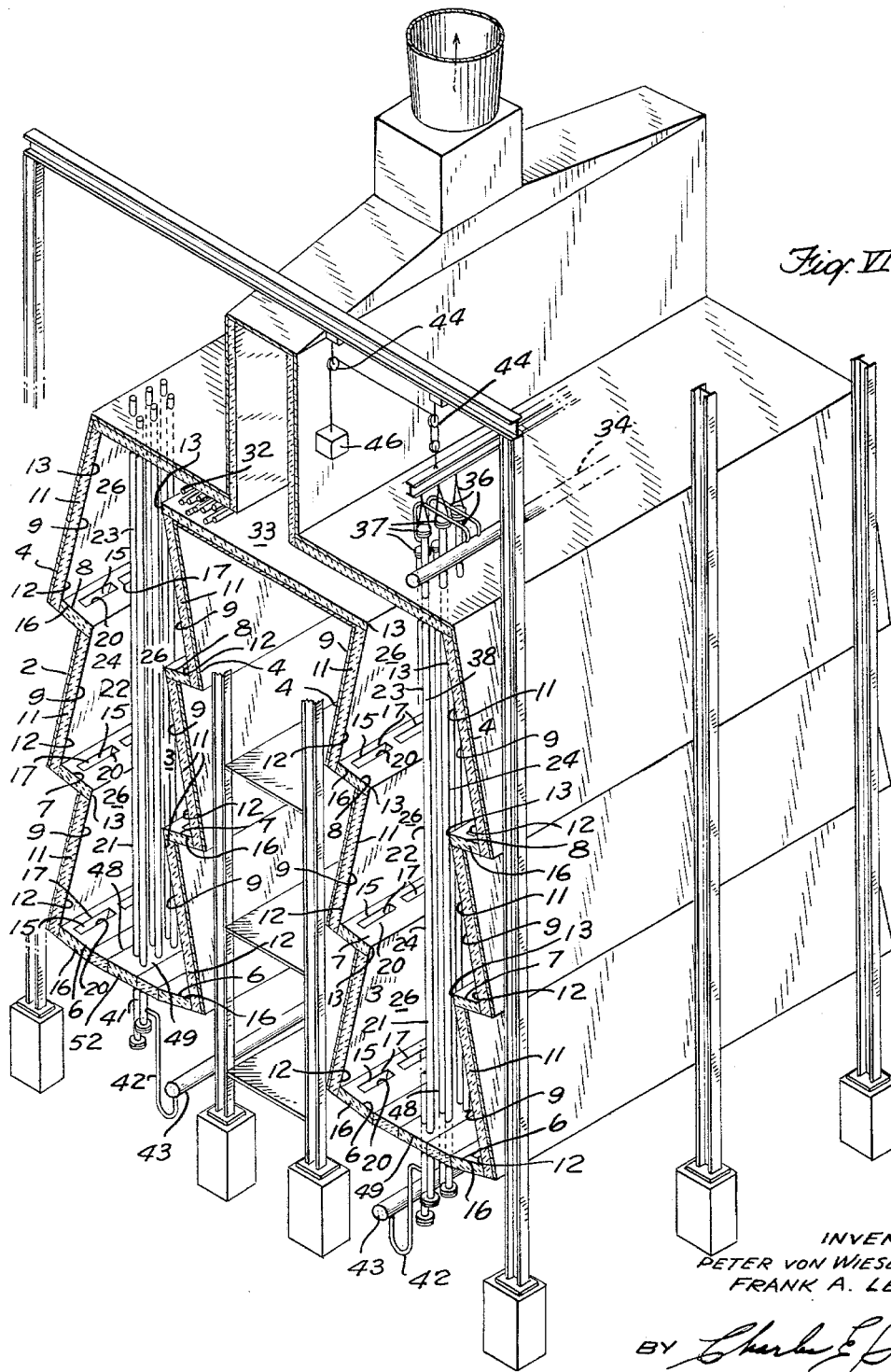

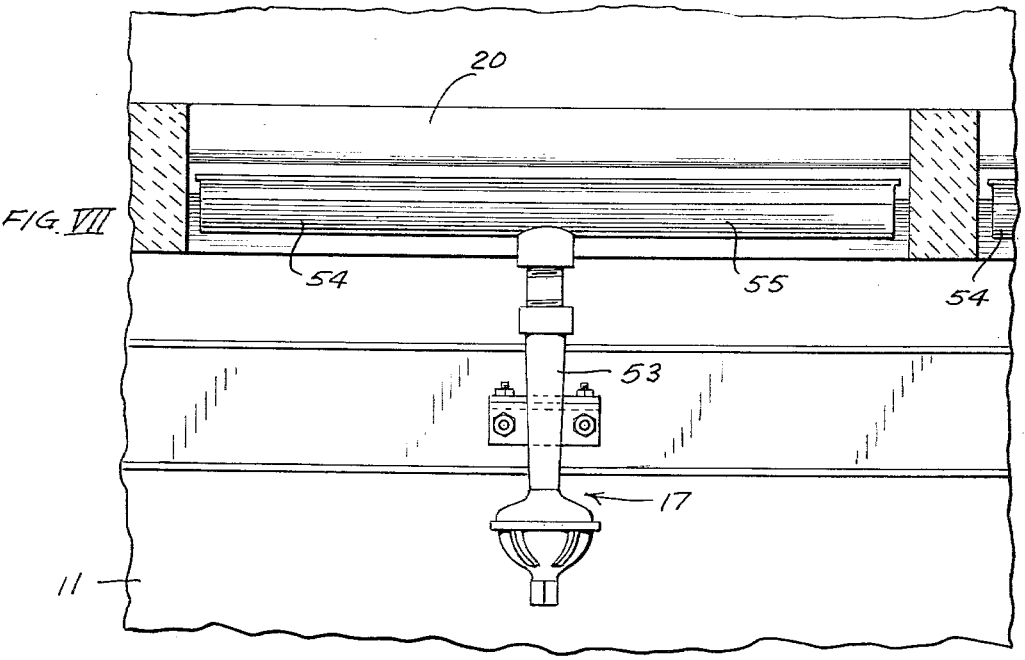
FIG. VII
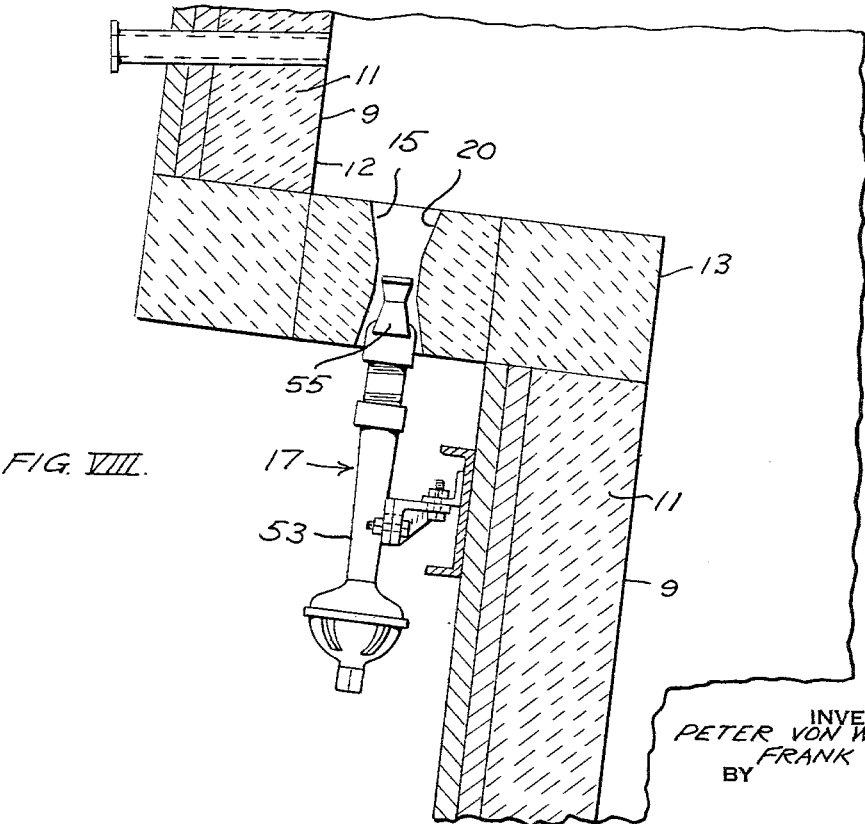
FIG. VIII.
INVENTORS
PETER VON WIESENTHAL
FRANK A. LEE
BY
ATTORNEY

3,230,052
TERRACED HEATERS
Frank A. Lee, Westwood, N.J., and Peter von Wiesenthal, New York, N.Y., assignors to Foster Wheeler Corporation, New York, N.Y., a corporation of New York
Filed Oct. 31, 1963, Ser. No. 320,567
2 Claims. (Cl. 23—277)

This application is a continuation-in-part of copending application Serial Number 155,351, filed November 28, 1961, now abandoned.

This invention relates to terraced heaters employed for introducing energy to fluids as they pass through catalyst filled tubes.

Terraced heaters have used horizontal tube configurations which were obvious choices because they offer long flow paths for prolonged contact. But experience has shown that horizontal tubing gives rise to severe performance and maintenance problems. Catalysts are usually available as granular solids with a narrow range of particle sizes. When the catalyst is fresh, its particles pack loosely, defining large interstices therebetween and offering high permeability to the fluid. Further, the permeability is uniformly distributed over the cross sections of the tubes. With age, cooling, heating, vibration and wear of particles one on another, the catalyst particles become finer, their range of sizes increases and their packing characteristics change. Finer sized particles migrate into interstices between larger particles thereby consolidating catalyst bulk. In horizontal tubes consolidation progresses in a vertical direction while flow of the fluid is horizontal. Flow paths through the lower portion of the tube cross sections become choked. Meanwhile, the settlement of catalyst results in a continuous catalyst-free passage adjacent the tops of the tubes. In following the path of least resistance, the fluid is shunted through these catalyst-free passages thereby reducing the retention time of the fluid to the detriment of the reaction yield. Accordingly, flow-through beds were reduced to flowby beds.

As a collateral problem, choked flow in the lower portions of horizontal tubes also gave rise to inadequate heat removal resulting in hot spots and catalyst deactivation.

Increasing the length of the horizontal flow path delayed the incidence of these difficulties, but it did not provide a cure.

The present invention solves these problems by employing vertical tubes between the oppositely disposed terraced side walls.

Basically, this design offers uniform permeability over the entire cross section of catalyst tubes. Consolidation progresses in the same direction as fluid flow. Thus, short circuiting is obviated with a consequent increase in retention time reducing the required length of flow path.

It would be pointless to go to this refinement without more obvious causes of hot spots being ameliorated. Accordingly, vertical tubing is especially adaptable for coaction with terraced heaters wherein opposed radiant planar surfaces are employed to evenly distribute heat flux over horizontal zones. Uniform catalyst to tube wall contact and zone-wide constant temperature give the best relief from hot spots thus far attainable. Tubes are close to the planar radiant surfaces for efficiency but are protected from direct impingement of combustion gases from the burners. Terraced heaters also offer the economy and versatility of being able to burn either gaseous or liquid fuels. Further, separate services are possible in different vertical tube banks since both horizontal and vertical heat flux control may be provided.

Non-catalytic endothermal reactions can be designed with parallel vertical tubes favoring liquid formation or conversion.

These and other advantages will appear more fully from the accompanying drawings wherein:

FIGURE I is an elevation view in section of a fired heater embodying the present advance.

FIGURE II is an elevation of part of the inside of a side wall of the heater of FIGURE I.

FIGURE III illustrates the manner in which the burners are connected for independent control of their rates of firing.

FIGURE IV is an enlarged section through a catalyst tube depicting the distribution of granular catalyst therein.

FIGURE V is an enlarged detail showing the connection of vertical catalyst tubes to the floor of the setting.

FIGURE VI is an isometric view partly in section of a second embodiment of the invention with two combustion chambers. Like numbers correspond to analogous parts throughout the views.

FIGURES VII and VIII illustrate a possible burner to trough relationship.

The heater shown in FIGURES I through V has a setting 2 which defines combustion chamber 3 embraced by a pair of stepped oppositely disposed side walls 4. Above paired steps 6, 7 and 8 each side wall slopes inwards upwardly so that the side walls define a number of sloping coplanar surfaces 9 faced with refractory material 11. Each coplanar surface 9 has a bottom 12 and an upper extremity 13. As is best seen in FIGURE I, the cross section of combustion chamber 3, although being generally rectangular is substantially that which is produced by the outline of a number of rectangular trapezoids such as those indicated in chain lines at 14 stacked small base on large base with a common axis of symmetry.

Along the steps 6, 7 and 8, i.e. near the outer ends 16 of the large bases of the hypothetical trapezoids, are arranged burner means shown as sets of short burst burners 17 which project their flame streams into longitudinal troughs 15 each to sweep an associated coplanar surface 9. Thus, each of these surfaces 9 can be uniformly heated to evenly emit radiation therefrom. Inner rims 20 divert the streams of combustion gases away from direct impingement onto the tubes.

The term "short burst" refers to flame length. This is a term used in the art, and burners providing short length flame are known.

It is an important aspect of the invention that the burners inject flame into each trough 15 to fill the trough so that hot combustion gases pass in sweeping relationship over substantially the entire or complete area of each surface 9 uniformly heating the refractory to incandescence. Using this design, actual tests have revealed temperature deviations of refractory surfaces to be less than two percent at temperatures as high as twenty five hundred degrees Fahrenheit. The rims 20 of the troughs 15 on the sides adjacent the tubes are formed steep enough to prevent direct impingement of hot combustion gases on the tubes. (Note that these rims are not raised since this might interfere with radiation by the refractory surface 9.) With this structure, almost all of the heat transmission to the catalyst tubes is in the form of two sided radiation from uniformly heated opposed planar surface 9. It should be emphasized that combustion of the gaseous fuel is practically completed before the combustion gases leave the trough.

The specific structure of the burners 17 and structural relationship of the burners to the troughs can be varied. Many variations or embodiments of the invention are possible within the scope and spirit of the invention, as long as the burners are constructed and disposed relative to the troughs so that combustion of the gaseous fuel is practically complete before the combustion gases leave the troughs.

One suitable arrangement is shown in FIGURES VII and VIII. The gas burner is a T-shaped member 53 having outwardly extending arms 54 and 55. Along the upper surface of the arms are a large number of holes by which gas is ejected from the burner. The burner arms are disposed in the lower portion of the trough substantially filling the bottom of the trough. The holes are numerous enough and small enough so that a large number of gas flames substantially fill the trough, combustion being substantially completed in the trough.

Control means shown as valves 18 and 19 are associated with each burner 17 to regulate the intensity of heat. By altering the firing rate of any set of paired burners disposed at the same elevation in steps 6, 7 and 8 respectively, different zones 21, 22 and 23 of tubes 24 can be subjected uniformly to heat intensities suitable for the reaction rate attainable therein.

Upper extremities 13 of paired side walls project toward each other to define restricted throats 26 therebetween so that combustion products will tend toward being confined to circulating in relatively closed convection systems 27, 28 and 29 which correspond with tube zones 21, 22 and 23, respectively.

FIGURE III shows how linear burners 17 can be connected to the source of fuel to provide for maximum control over the heating of individual zones 21, 22 and 23. Burners 17 of each step 6, 7 and 8 are connected in parallel through valves 18. Burners of paired steps 6, 7 and 8 are connected in parallel to fuel supply line 31 via valve 19.

The process fluid to be heated is caused to flow through preheat conduit 32 in flue passage 33 wherein it is preheated by flue gases. The fluid then passes to header drum 34. A plurality of flexible tubes 36 communicate the fluid to the upper ends 37 of parallel vertical tubes 24 for passage through the voids defined by granular catalyst 38. Granular catalyst 38 is disposed in the tubes 24 as shown in FIGURE IV. The process fluid exits through bottom 41 of the catalyst tubes via elbows 42 and outlet manifold 43.

Catalyst tubes 24 are supported by suspension with pulleys 44 and counterweights 46. As seen in FIGURE V, seal plates 47 engage ports 48 in floor 49. Ports 48 are also provided with loose insulation 51 and closure tile 52.

The isometric view presented in FIGURE VI lends a third dimension to the foregoing features. Also, FIGURE VI specifically teaches a twin chamber arrangement for practicing this invention.

It will be understood by those skilled in the art that changes may be made in the details of this design without departing from the scope of invention defined by the claims.

In the claims:
1. A heater comprising
    a housing which includes a floor and a pair of longitudinally extending side walls oppositely disposed relative each other and spaced apart to embrace a chamber in the housing;
    each side wall comprising a plurality of adjacent planar surfaces one above the other, each planar surface having a bottom and top extremity and being uninterrupted by any projections intermediate the ends;
    refractory facing on the planar surfaces on the chamber side thereof;
    step means along the bottom extremity of each planar surface protruding inwardly from the planar surface, the step means defining a plurality of elongated adjacent troughs parallel with the planar surface, the troughs occupying a major portion of the length of the step and being aligned and approximately coextensive with the surface;
    burner means disposed to inject flame into each trough to substantially fill the trough, combustion being substantially completed in the trough, so that hot combustion gases pass in sweeping relationship over substantially the entire area of each of the planar surfaces for uniformly heating the refractory thereof to incandescence;
    a plurality of vertically extending tubes mounted approximately midway between the side walls and positioned to receive radiation from the planar surfaces;
    each of the troughs having a steep rim on the side adjacent the tubes to divert the hot combustion gases from the tubes;
    flow means for coursing a process fluid through the tubes;
    flue means for exhausting combustion products from the chamber.
2. The heater of claim 1 wherein
    the planar surfaces are arranged so that the bottom and top extremities of opposing planar surfaces are at the same elevation;
    the top extremity of each planar surface being inwardly inclined relative the bottom extremity so that in vertical cross-section the side walls substantially outline a plurality of regular trapezoids stacked large base on small base with a common axis of symmetry;
    the top extremities of the planar surfaces projecting towards each other to define restrictive throats therebetween so that combustion gases will tend towards being confined to circulation in relatively closed convective systems between successive throats.

References Cited by the Examiner
UNITED STATES PATENTS

| | | | |
|---|---|---|---|
| 2,338,295 | 1/1944 | Mekler | 122—356 |
| 2,638,879 | 5/1953 | Hess | 122—356 |
| 2,660,519 | 11/1953 | McCarthy | 23—288 |
| 2,914,386 | 11/1959 | Shapleigh | 23—277 |
| 2,993,479 | 7/1961 | Thurley | 122—356 XR |
| 3,002,505 | 10/1961 | Fleischer | 122—356 XR |
| 3,062,197 | 11/1962 | Fleischer | 122—510 |
| 3,063,814 | 11/1962 | Shapleigh | 23—277 |

FOREIGN PATENTS 596,819    4/1960    Canada.

MORRIS O. WOLK, *Primary Examiner.*